(12) United States Patent
Rottenau et al.

(10) Patent No.: US 11,052,704 B2
(45) Date of Patent: Jul. 6, 2021

(54) CASTER WITH BRAKING DEVICE

(71) Applicant: GROSS + FROELICH GMBH & CO. KG, Weil der Stadt (DE)

(72) Inventors: Hans-Wilhelm Rottenau, Hechingen (DE); Ralph Von Bordelius, Bad Liebenzell (DE)

(73) Assignee: GROSS + FROELICH GMBH & CO., Weil der Stadt (DE)

( * ) Notice: Subject to any disclaimer, the term of this patent is extended or adjusted under 35 U.S.C. 154(b) by 0 days.

(21) Appl. No.: 16/464,992

(22) PCT Filed: Nov. 29, 2017

(86) PCT No.: PCT/EP2017/080789
§ 371 (c)(1),
(2) Date: May 29, 2019

(87) PCT Pub. No.: WO2018/099953
PCT Pub. Date: Jun. 7, 2018

(65) Prior Publication Data
US 2019/0308450 A1    Oct. 10, 2019

(30) Foreign Application Priority Data

Nov. 30, 2016  (DE) ..................... 10 2016 123 080.4

(51) Int. Cl.
*B60B 33/00*     (2006.01)
(52) U.S. Cl.
CPC ...... *B60B 33/0078* (2013.01); *B60B 33/0042* (2013.01); *B60B 33/0049* (2013.01);
(Continued)
(58) Field of Classification Search
CPC . Y10T 16/195; Y10T 16/196; B60B 33/0028; B60B 33/0055; B60B 33/0094;
(Continued)

(56) References Cited

U.S. PATENT DOCUMENTS 3,914,821 A * 10/1975 Screen ................ B60B 33/0042
16/35 R
4,455,707 A *  6/1984 Screen ................ B60B 33/0042
16/35 R
(Continued)

FOREIGN PATENT DOCUMENTS

DE      26 56 023 A1    6/1978
DE      27 37 650 A1    3/1979
(Continued)

OTHER PUBLICATIONS

English Translation of International Preliminary Report on Patentability dated Oct. 1, 2018.
(Continued)

*Primary Examiner* — Chuck Y Mah
(74) *Attorney, Agent, or Firm* — Dickinson Wright PLLC (57) ABSTRACT

The present disclosure relates to a caster, having a housing, having an axle pin which is arranged in a housing opening which is oriented substantially horizontally, and on which at least one wheel is mounted, having, at the top, a pin opening oriented substantially vertically, for receiving a pivot pin, and having a braking device which brakes the at least one wheel, wherein the housing opening for the axle pin allows limited vertical displaceability of the axle pin and the braking device comprises at least one resilient housing part which acts on the axle pin. In order to provide a mechanically reliable braking device, the braking device is additionally provided with at least one spring element which cooperates with the at least one resilient housing part and amplifies the effect of its braking force and/or increases the mechanical load-bearing capacity of the at least one resilient housing part.

20 Claims, 9 Drawing Sheets

(52) U.S. Cl.
CPC ...... *B60B 33/0057* (2013.01); *B60B 33/0068* (2013.01); *B60B 33/0073* (2013.01); *B60B 33/0084* (2013.01); *B60B 33/0094* (2013.01); *B60B 2200/222* (2013.01); *B60B 2360/10* (2013.01); *B60B 2360/102* (2013.01); *B60B 2360/32* (2013.01); *B60B 2360/322* (2013.01); *B60B 2360/341* (2013.01); *B60B 2900/112* (2013.01); *B60B 2900/321* (2013.01); *B60B 2900/325* (2013.01)

(58) Field of Classification Search
CPC ............ B60B 33/0039; B60B 33/0049; B60B 33/0057; B60B 33/0068; B60B 33/0081; B60B 33/0084; B60B 33/0092; B60B 33/025; B60B 33/021; B60B 33/0042; B60B 33/0073; B60B 33/0078; B60B 33/0086; B60B 37/10; B60B 2200/222; B60B 2200/242; B60B 2900/531; A61G 7/0528; F16D 49/00; F16D 65/42; F16D 212/14; F16D 2125/32
See application file for complete search history.

(56) References Cited

U.S. PATENT DOCUMENTS

| | | | | |
|---|---|---|---|---|
| 4,821,369 A | * | 4/1989 | Daniels | B60B 33/0042 16/35 R |
| 5,355,550 A | * | 10/1994 | Yang | B60B 33/0002 16/35 R |
| 5,617,934 A | * | 4/1997 | Yang | B60B 33/0042 16/35 R |
| 6,092,262 A | * | 7/2000 | Lin | B60B 33/0084 16/19 |
| 6,256,835 B1 | * | 7/2001 | Wang | B60B 33/001 16/35 D |
| 8,151,412 B2 | * | 4/2012 | Berger | B60B 33/0073 16/47 |
| 2001/0039693 A1 | * | 11/2001 | Melara | B60B 33/0028 16/35 R |
| 2005/0108851 A1 | * | 5/2005 | Dayt | B60B 33/0068 16/31 R |
| 2009/0049647 A1 | * | 2/2009 | Berger | B60B 33/0021 16/35 R |
| 2015/0047148 A1 | | 2/2015 | Melara | |

FOREIGN PATENT DOCUMENTS

| | | | | |
|---|---|---|---|---|
| DE | 91 03 097 U1 | | 8/1991 | |
| DE | 10 2015 103 869 A1 | | 7/2016 | |
| EP | 0 458 446 A1 | | 11/1991 | |
| JP | 03266702 A | * | 11/1991 | ......... B60B 33/0042 |
| KR | 100865732 B1 | * | 10/2008 | ............ A47C 7/006 |
| WO | WO 81/02273 A1 | | 8/1981 | |
| WO | WO 2011/111946 A2 | | 9/2011 | |
| WO | WO 2016/206262 A1 | | 12/2016 | |

OTHER PUBLICATIONS

Corresponding German Search Report for German Application No. 10 2016 123 080.4, dated Oct. 6, 2017, 8 pgs.
International Search Report for International Application No. PCT/EP2017/080789, dated Aug. 1, 2018, 9 pgs.
International Preliminary Examination Report and Amended Pages for International Application No. PCT/EP2017/080789, dated Apr. 2, 2019.

* cited by examiner

CASTER WITH BRAKING DEVICE

RELATED APPLICATIONS

This application claims priority to German Patent Application No. 10 2016 123 080.4, filed Nov. 30, 2016, and PCT/EP2017/080789, filed Nov. 29, 2017, the entire contents of which are incorporated herein by reference in their entirety.

FIELD

The present disclosure relates to a caster having a braking device and a resilient housing.

BACKGROUND

The present disclosure relates to a caster, having a housing, having an axle pin which is arranged in a housing opening which is oriented substantially horizontally, and on which at least one wheel is mounted, having, at the top, a pin opening oriented substantially vertically, for accommodating a pivot pin, and having a braking device which brakes the at least one wheel in a first load state and releases the wheel in a second load state, wherein the housing opening for the axle pin allows a limited ability of the axle pin to be displaced vertically, and the braking device comprises at least one resilient housing portion which acts on the axle pin. In an alternative embodiment, the present disclosure relates to a caster, having a housing, having an axle pin which is arranged in a housing opening oriented substantially horizontally, and on which at least one wheel is mounted, having, at the top, a pin opening oriented substantially vertically, for accommodating a pivot pin, and having a braking device which brakes the at least one wheel in a first load state and releases the wheel in a second load state, wherein the braking device comprises at least one resilient housing portion.

In casters of this kind, which can be designed both as single casters with one wheel, or as double casters with two wheels, a braking force should be exerted on the wheel(s) in one load state—for example, the unloaded state—in order to prevent a piece of furniture—typically an office chair—equipped with these casters from rolling away, to protect against accidents. In order to achieve this, various braking devices for casters have been proposed in the past. However, some of these are very mechanically complicated, and thus costly. A caster of the type mentioned above is known from DE 10 2015 103 869 A1. In this caster, there is at least one spring which acts on the axle pin and biases it in the direction of at least one braking surface. The spring is formed integrally with the plastic housing of the caster. This simple solution is very inexpensive, but has the disadvantage of relatively low mechanical load capacity, especially in the tests performed by manufacturers in which an impact is directed on the axle and thus the spring.

BRIEF SUMMARY

The present disclosure provides a generic caster which has cost-effective, yet mechanically reliable braking device.

The problems of existing casters is addressed by the combinations of features specified in claims 1 and 11. Advantageous embodiments and implementations of the invention disclosure will become apparent from the dependent claims.

The present disclosure provides a mechanical reinforcement of a spring of a braking device, the spring formed integrally with the caster housing, and collectively or alternatively provides an arrangement of the housing opening which accommodates the axle pin in a housing portion with a limited, elastic ability for displacement, formed integrally with the caster housing.

According to a first variant of the present disclosure, the braking device further comprises at least one spring element which cooperates with the at least one resilient housing portion, enhancing the braking force effect and/or increasing the mechanical load capacity of the at least one resilient housing portion. The housing, or at least the resilient housing portion, is preferably made of a plastic, for example polypropylene or polyamide. Suitably, the at least one spring element is made of metal, of a fiber-reinforced plastic, or of another material with a higher mechanical load capacity than the at least one resilient housing portion.

The at least one spring element can be designed, according to a first exemplary embodiment, as a leaf spring which is embedded in the material of the at least one resilient housing portion. This is expediently achieved by arranging the spring element as an insert part in an injection mold for the caster housing, and then molding the insert. The advantage of this is that the spring element has no direct contact with the axle pin, and accordingly does not generate any noise or cause any wear. However, the at least one spring element can also project beyond the at least one resilient housing portion in the direction of the at least one wheel, and the end regions of the spring element can then be coated or otherwise configured to prevent noise and wear.

In one embodiment, the braking effect is not achieved directly by the resilient housing portion acting on the axle pin—supported by the spring member. Rather, it is achieved by the axle pin being pushed vertically in the housing opening formed as an elongated hole, such that a housing element acts as a brake on the at least one wheel. In an advantageous embodiment of the present disclosure, for this purpose the housing has at least one wall portion, which projects laterally beyond the housing opening for the axle pin, and which a hub of the at least one wheel contacts with a force fit and/or a positive fit in the first, braking load state of the caster.

The at least one resilient housing portion is expediently created by at least two open-edged slots in a ring collar of the housing opening which receives the axle pin, said slots holding the at least one resilient housing portion between them. The resilient housing portion thus forms at least a sector of the collar edge.

While the present disclosure can also be implemented for single-wheel casters, the main field of application is double casters for furniture—in particular, for office chairs. In a preferred embodiment of the present disclosure, the caster is therefore designed as a double caster having two wheels, each arranged on one end of the axle pin, wherein the braking device has resilient housing portions facing each of the wheels.

In an alternative embodiment of the present disclosure, the at least one spring element is arranged on a lateral housing surface, acting on the side of the at least one resilient housing portion which faces away from the axle pin, in such a manner that the at least one resilient housing portion is clamped between the at least one spring element and the axle pin. For this purpose, projections are expediently arranged on the lateral housing surface, and define end regions of the at least one spring element on the lateral housing surface.

According to a further variant of the present disclosure, there is a resilient housing portion which does not act on the axle pin—but rather receives it. That is, the housing opening oriented substantially horizontally is formed in a housing portion which is elastically vertically displaceable relative to the rest of the housing. The housing opening which receives the axle pin is not formed in this case as an elongated hole, since the axle pin need not be displaced inside it. This is advantageous for the wear behavior of the opening, and thus the caster housing. In order to achieve the resilient displaceability of the housing portion, the housing portion can preferably be integrally connected via spring webs to the rest of the housing. The possible vertical displacement path of the housing portion is advantageously defined by a gap provided above the housing portion. An elastically compressible molded part or a leaf spring can be arranged in the gap as a way of influencing the force required to displace the housing portion. Different materials or material quantities or geometries enable an adjustment of the desired result. Since the caster housing can be designed in the relevant area to be comparatively narrow or thin-walled, a lateral housing surface can have at least one laterally-protruding projection which serves as a stop for the housing portion, and/or enlarges the stop surface for the housing portion.

According to a variant of this embodiment, the housing portion which receives the axle pin can be arranged in a honeycomb structure with open honeycomb cells running parallel to the housing opening which receives the axle pin.

The braking device of the two latter embodiment variants expediently has at least one projection which protrudes laterally beyond a lateral housing surface and acts as a brake shoe, arranged radially inward relative to a wheel jacket of the at least one wheel, in such a manner that a braking surface of the projection works together with a force fit or a positive fit with the radially-inner region of the wheel jacket in the first load state. Because of the greater distance of this braking surface from the wheel center, compared to that of the embodiments mentioned first, it is possible to generate greater braking torque.

BRIEF DESCRIPTION OF THE DRAWINGS

The present disclosure will be explained below in more detail with reference to an embodiment shown schematically in the drawings, wherein:

FIGS. 1 *a* to *c* show a first embodiment of the present disclosure in a partial cutaway view and in a sectional view, in the unloaded, braked state;

FIGS. 2*a* and *b* show the caster in views corresponding to FIGS. 1 *a* and *c*, in the loaded, rolling state;

FIGS. 4*a* and *b* show the caster in views corresponding to FIGS. 3*a* and *c*, in the loaded, rolling state;

FIGS. 11 *a* to *c* show an unloaded, braked caster with a single wheel and a braking device which corresponds to the braking device shown in FIGS. 5 and 6;

DETAILED DESCRIPTION

Figure 1:
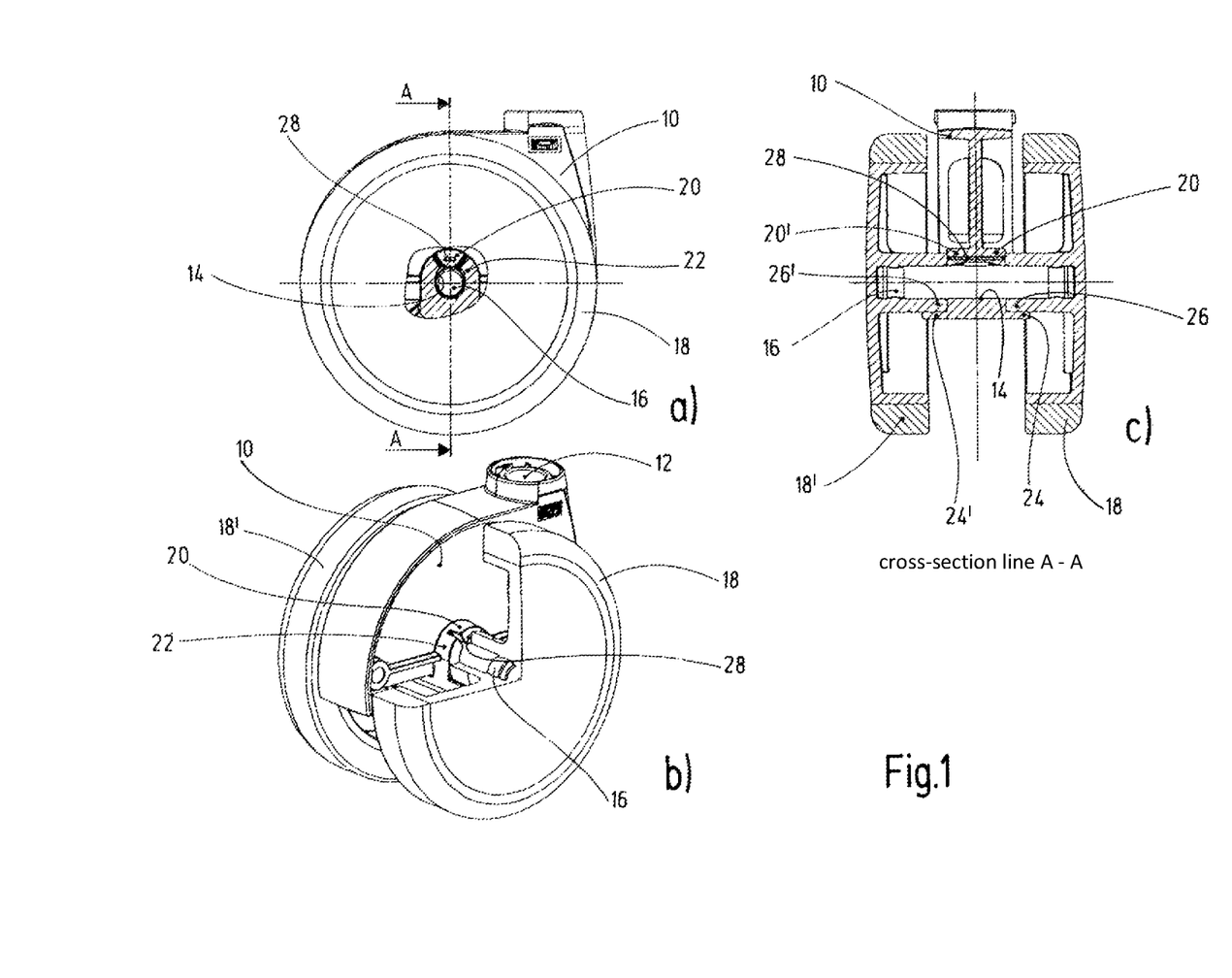
Figure 2:
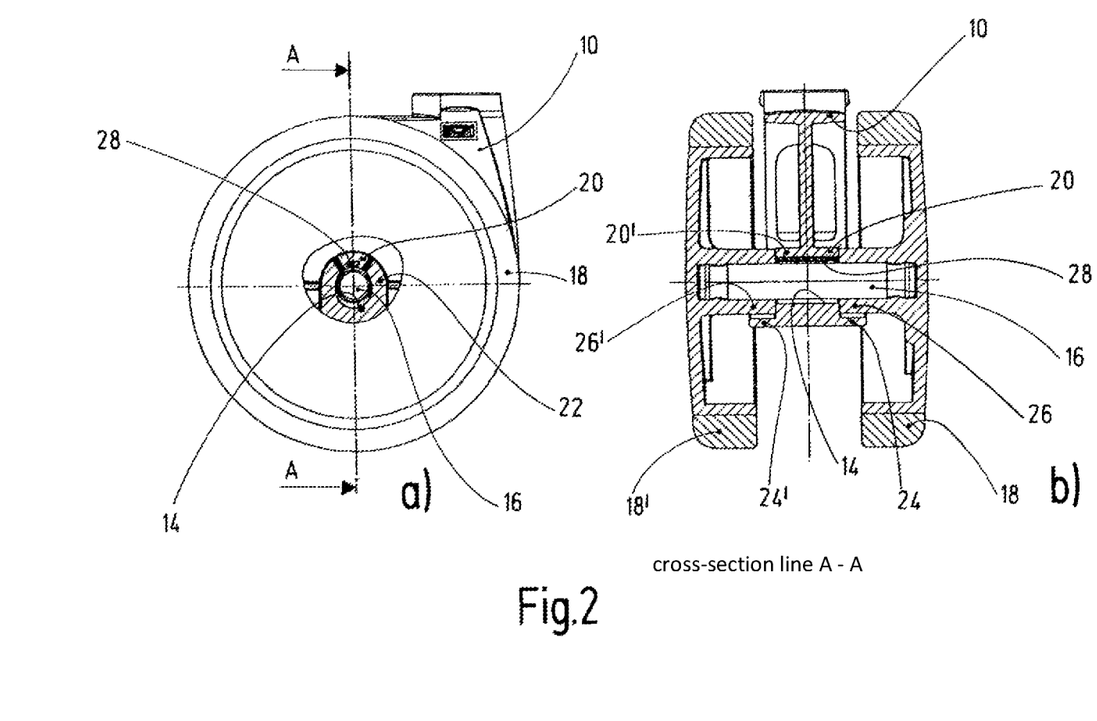

The caster shown in FIGS. 1 and 2 is designed as a double caster, and comprises a housing 10 with, at the top, a substantially vertical pin opening 12 for receiving a pivot pin to connect the caster with a piece of furniture, a housing opening 14 oriented substantially horizontally, for receiving an axle pin 16, and two wheels 18, 18', each attached to one end of the axle pin 16. The housing opening 14 is formed as an elongated hole, in such a manner that the axle pin 16 is accommodated in the housing opening 14 in a manner allowing limited vertical displacement. It has no significant play otherwise, such that the axle pin 16 is seated in the housing opening 14 in a manner preventing wobbling.

The caster has a braking device which exerts a braking force on the wheels 18, 18' in the unloaded state of the caster (FIG. 1) and releases the wheels 18, 18' in the loaded state (FIG. 2).

The braking device comprises resilient housing portions 20, 20' which are formed by slots in a ring collar 22 of the housing 10, said slots enclosing the housing opening 14 which receives the axle pin 16, and which exerts a spring force on the axle pin 16 from above. Due to the elongated hole shape of the housing opening 14, the axle pin 16 is pressed against the lower edge of the housing opening 14 in the unloaded state of the caster. This simultaneously causes lateral projections 24, 24' of wheel hubs 26, 26' of the wheels 18, 18' to be loaded, generating a frictional engagement which brakes the caster. Since the housing sections 20, 20' are made of the comparatively soft plastic material of the housing 10, they can only generate a limited braking force, and can only be loaded mechanically to a limited degree. For this reason, the braking device further comprises a spring element 28 which is molded during the production of the housing as an insert made of the material of the resilient housing portions 20, 20', and which reinforces the resilient housing portions 20, 20' both in terms of generated braking force and in terms of mechanical load capacity. The spring element is made of a suitable material, such as spring steel, carbon fiber material, or glass fiber reinforced plastic.

FIG. 2 shows views of the caster according to FIGS. 1*a* and *c*, but in the loaded state—that is, for example, when a person is sitting on an office chair equipped with the casters. The wheels 18, 18' resting on the floor are subject to a counterforce corresponding to the weight load, which pushes the wheels 18, 18', and thus the axle pin 16, upwards. This occurs in opposition to the spring force of the combination of the resilient housing portions 20, 20' and the spring element 28, which are elastically deformed upwards as a result, until the axle pin 16 impacts the upper edge of the housing opening 14. At the same time, the wheel hubs 26, 26' are lifted off the projections 24, 24' and the braking force on the wheels 18, 18' is accordingly removed. The wheels 18, 18' can now roll freely.

Figure 3:
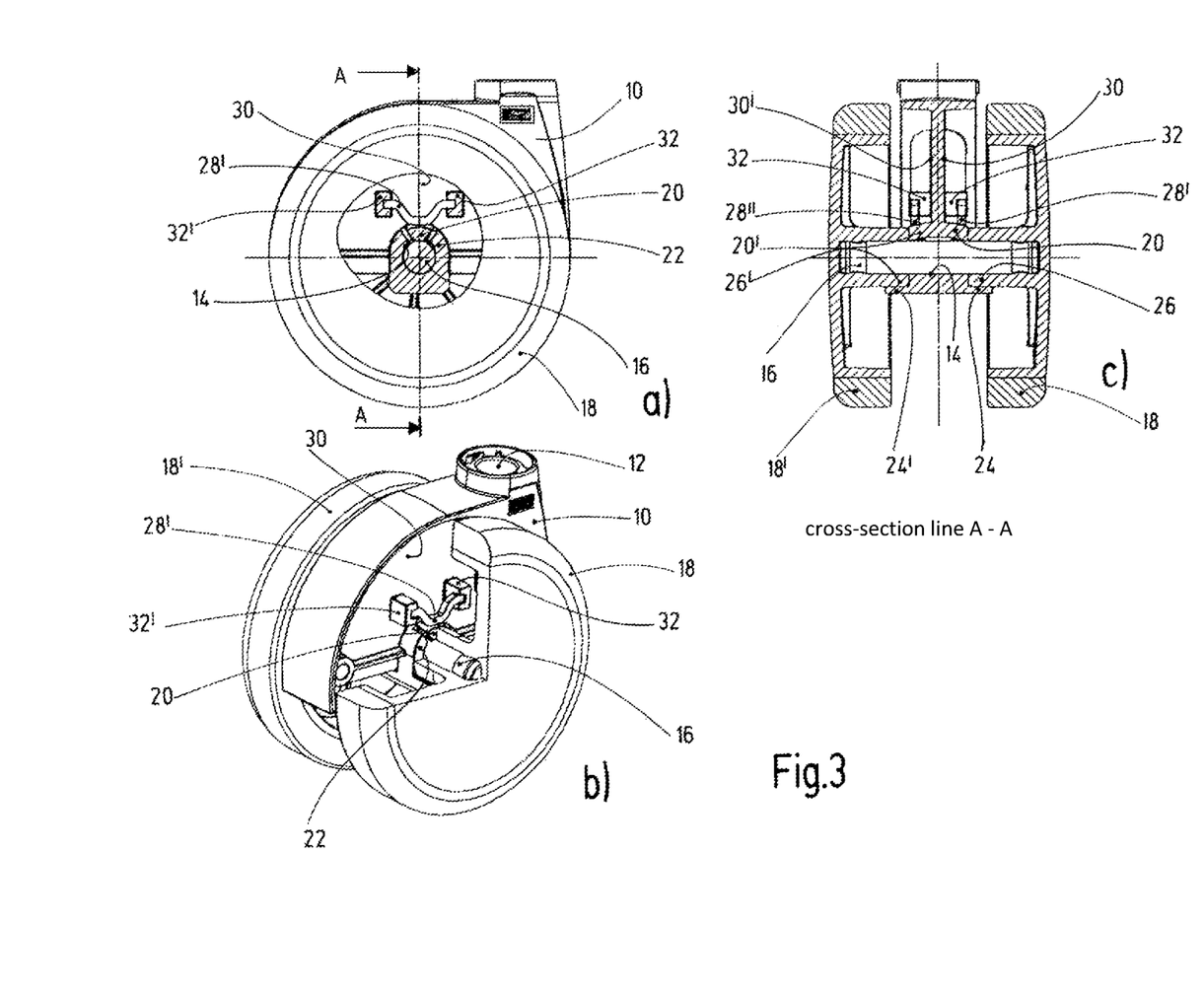
FIGS. 3*a* to *c* show a second embodiment of the invention disclosure in a partial cutaway view and in a sectional view, in the unloaded, braked state.
Figure 4:
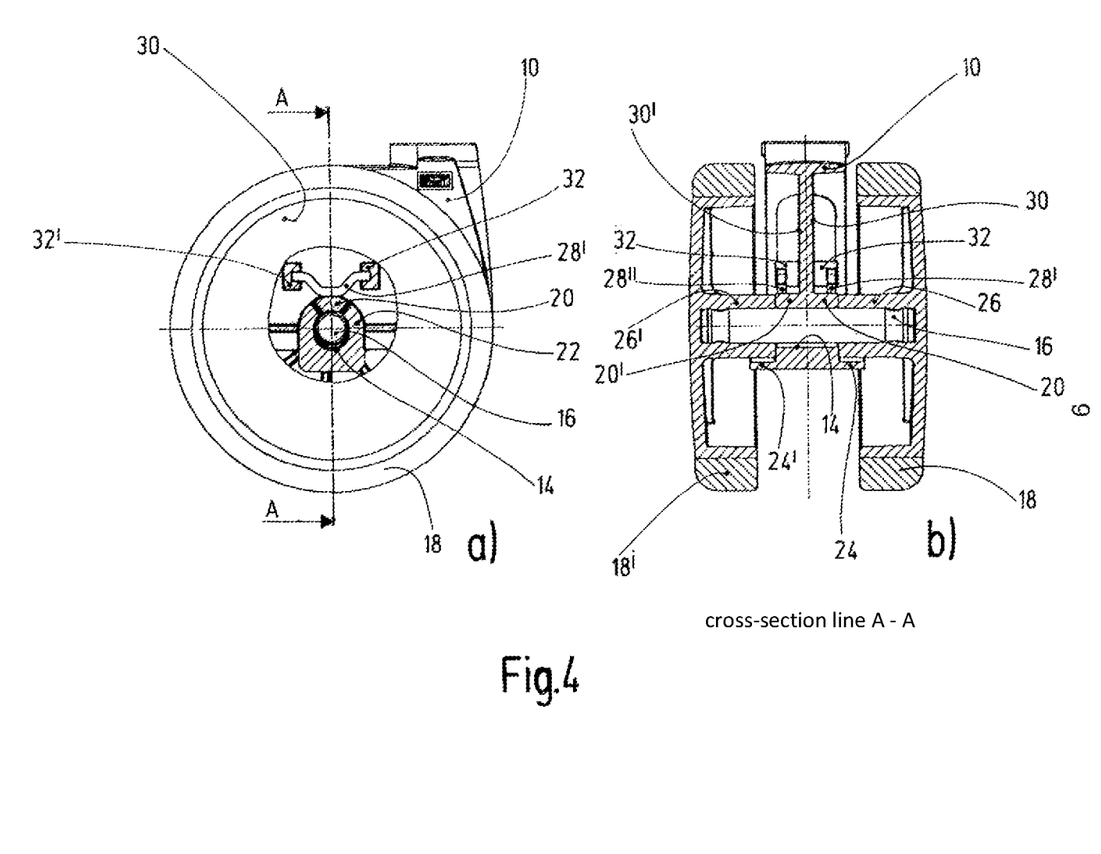

FIG. 3 and FIG. 4 show a second embodiment of the braking device in the unloaded, braked state (FIG. 3) and in the loaded, rolling state (FIG. 4). These differ with respect to the design and arrangement of the spring element 28', 28" from the embodiment of FIG. 1 and FIG. 2. However, they correspond to the embodiment of FIG. 1 and FIG. 2 otherwise, such that the same reference numerals are used for matching parts, and reference can be made in this regard in detail to the above description—in particular, with regard to the functionality of the braking device.

The spring element in this case is not embedded in the resilient housing sections 20, 20'. Rather, there are two spring elements 28', 28", which are each arranged on the lateral housing wall 30, 30' above the resilient housing portions, clamping the latter to generate a spring force between it and the axle pin 16. The spring elements 28', 28" are approximately yoke-shaped and have a central portion which acts on the resilient housing portions 20, 20'. The free ends of the spring elements 28', 28" are fixed in the projections 32, 32' molded onto the lateral housing walls 30, 30". Just like the spring element 28 (FIG. 1 and FIG. 2), the spring elements 28', 28" are made of a suitable material such as spring steel, carbon fiber material, or glass fiber reinforced plastic.

Figure 5:
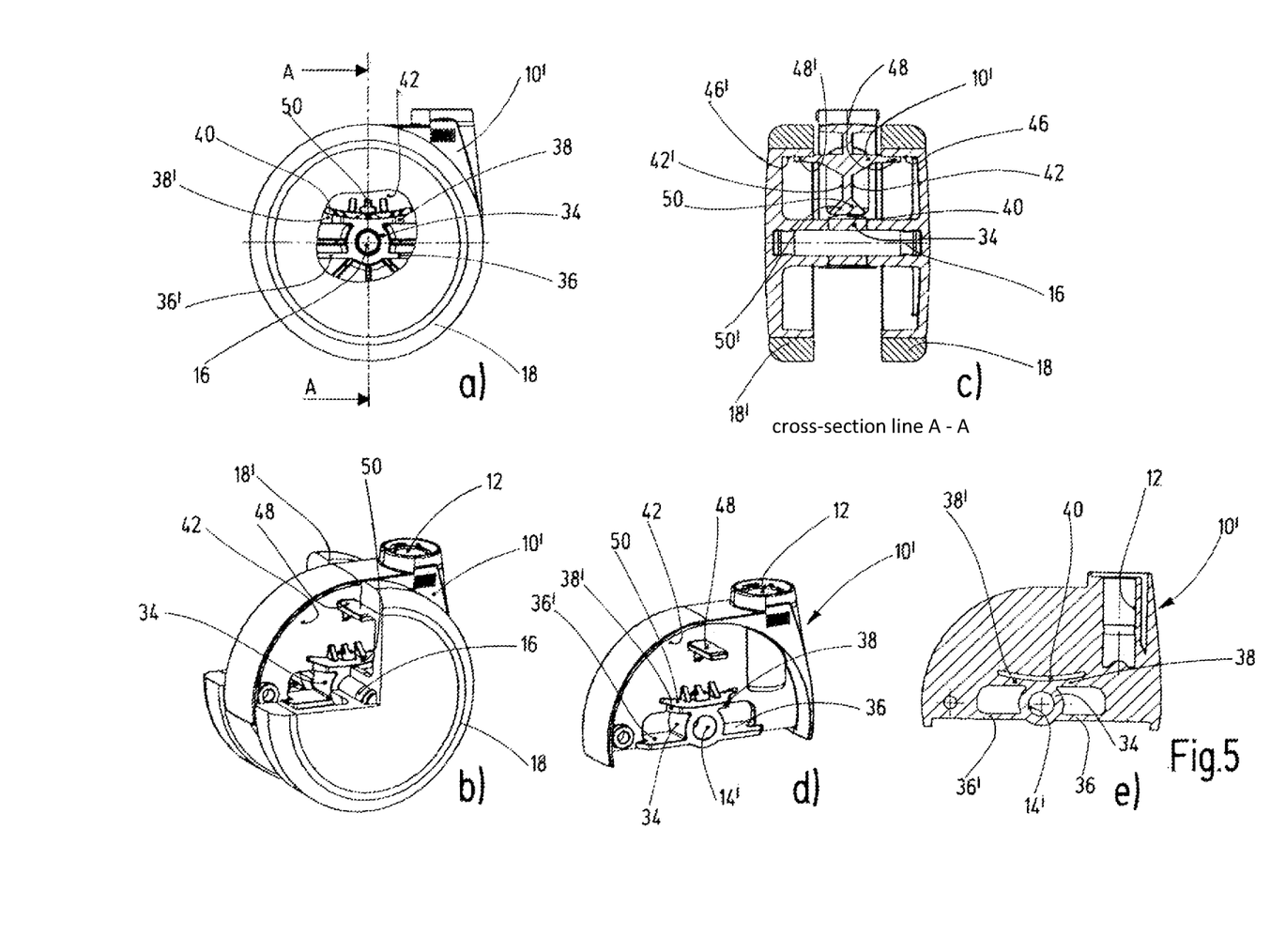
FIGS. 5*a* to *e* show different views of an alternative embodiment of the present disclosure, in the unloaded, braked state.
Figure 6:
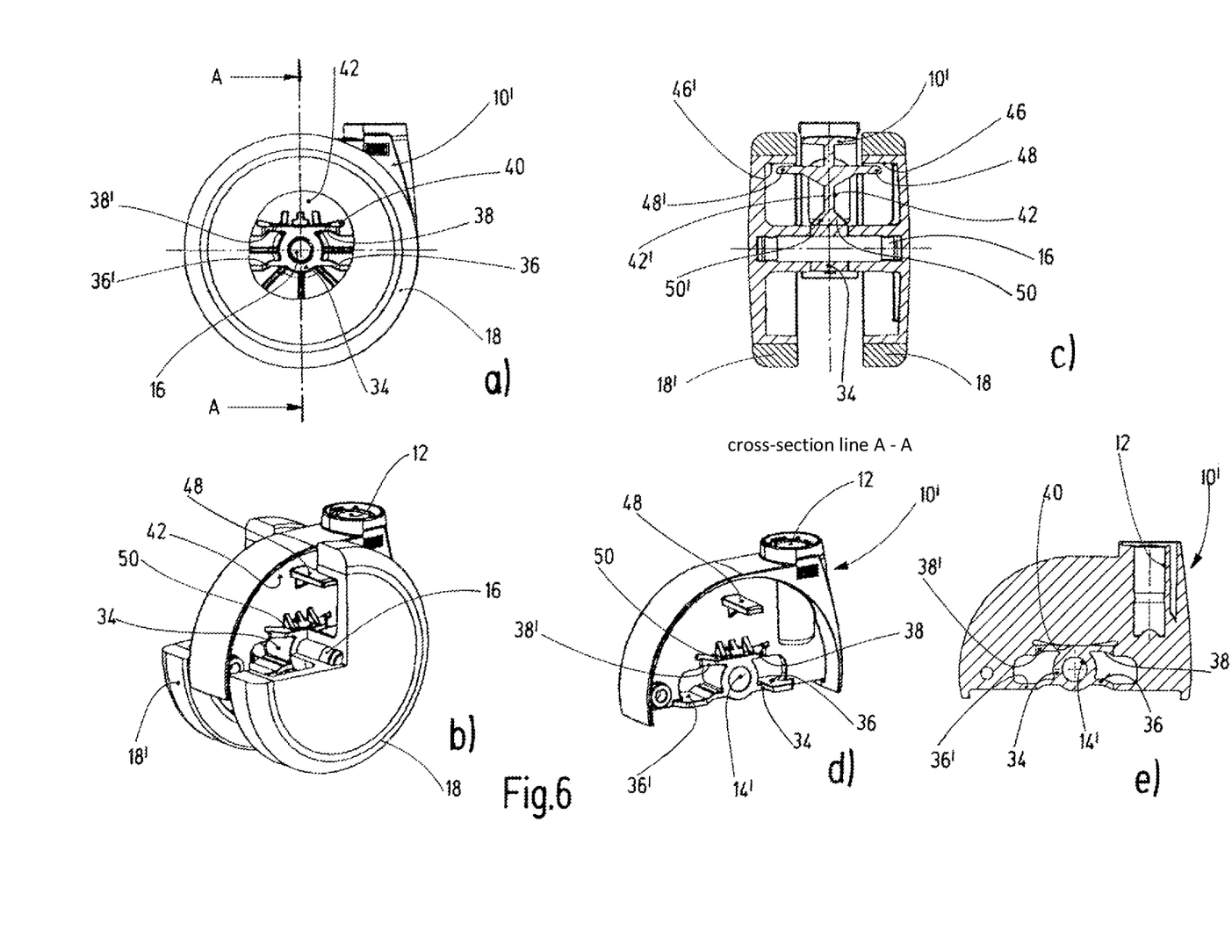
FIGS. 6*a* to *e* show different views of the caster, corresponding respectively to FIGS. 5*a* to *e*, in the loaded, rolling state.

FIG. 5 and FIG. 6 show an alternative embodiment of a caster having a braking device—in the unloaded, braked state (FIG. 5) and in the loaded, rolling state (FIG. 6). It has a resilient housing portion with a different design, and thus generally does not require an additional spring element—although such a spring element can also be included if this should prove necessary in the specific case. The caster shown is again designed as a double caster; but the principle of operation of this braking device is also applicable to single wheel casters.

The caster in FIG. 5 and FIG. 6 comprises a housing 10' with a housing opening oriented substantially horizontally 14', for receiving the axle pin 16, with the wheels 18, 18' arranged at the end regions thereof, and the pin opening 12 open at the top. Since the axle pin 16 is not displaced inside the housing opening 14' between the two operating states in this embodiment, the housing opening 14' is circular.

The housing opening 14' is in a housing portion 34 which is resiliently connected via webs 36, 36', 38, 38' to the rest of the housing 10'. A narrow gap 40 which defines the spring travel of the braking device is formed between the top side of the housing portion 34 and the housing 10'. In addition, projections 44, 44' which protrude beyond the lateral walls 42, 42' of the housing 10' are included, functioning as brake shoes of the braking device.

The webs 36, 36', 38, 38' connect the housing portion 34 to the housing 10' in such a manner that the housing portion 34 is in a lower position in the unloaded state of the caster shown in FIG. 5. Radial inner flanks 46, 46' of the wheels 18, 18' are pulled in this position against projections 48, 48' adjoining an upper region of the lateral walls 42, 42', thereby braking the wheels 18, 18' of the caster.

If the caster is loaded by weight, the position of the housing portion 34 shown in FIG. 6 is assumed. The housing portion 34 is pressed upwards against the spring force of the webs 36, 36', 38, 38' until the gap 40 is closed and the housing portion 34 impacts the corresponding counterpart of the housing 10'. Since the housing 10' is comparatively thin-walled in the area in question, stop projections 50, 50' adjoining the upper edge of the gap 40 are included, enlarging the stop surface on the housing for the housing portion 34, and thereby enabling a greater absorption of force. At the same time, the wheels 18, 18' arranged on the axle pin 16 are displaced upwards together with the housing portion 34, and thus lifted off the braking surfaces of the projections 48, 48'. As a result, the caster is transferred into the non-braked, rolling operating state.

An elastic, molded body can additionally be arranged in the gap 40 to adjust the force required for the displacement of the housing portion 34. Furthermore, the connection between the housing portion 34 and the housing 10' by means of the webs 36, 36', 38, 38' is only one possible embodiment of a resilient connection. Instead of the webs, the housing portion 34 could be embedded, by way of example, in a vertically elastically deformable honeycomb structure. FIGS. 7 to 12 show three embodiments of a caster, in the braked and unbraked state, each having a single wheel and a braking device, respectively corresponding to the variations of the embodiments according to FIGS. 1 to 6.

Figure 7:
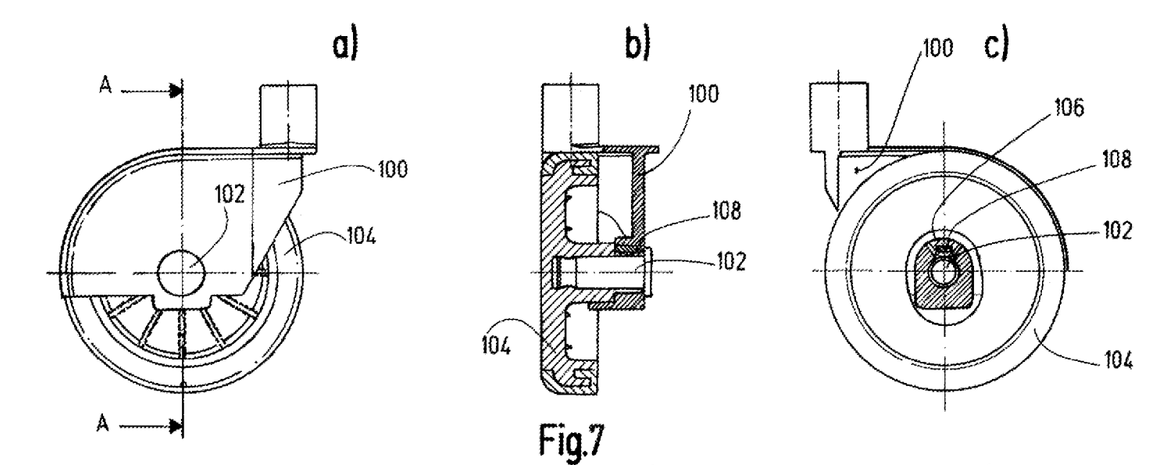
FIGS. 7*a* to *c* show an unloaded, braked caster with a single wheel and a braking device which corresponds to the braking device shown in FIGS. 1 and 2.
Figure 8:
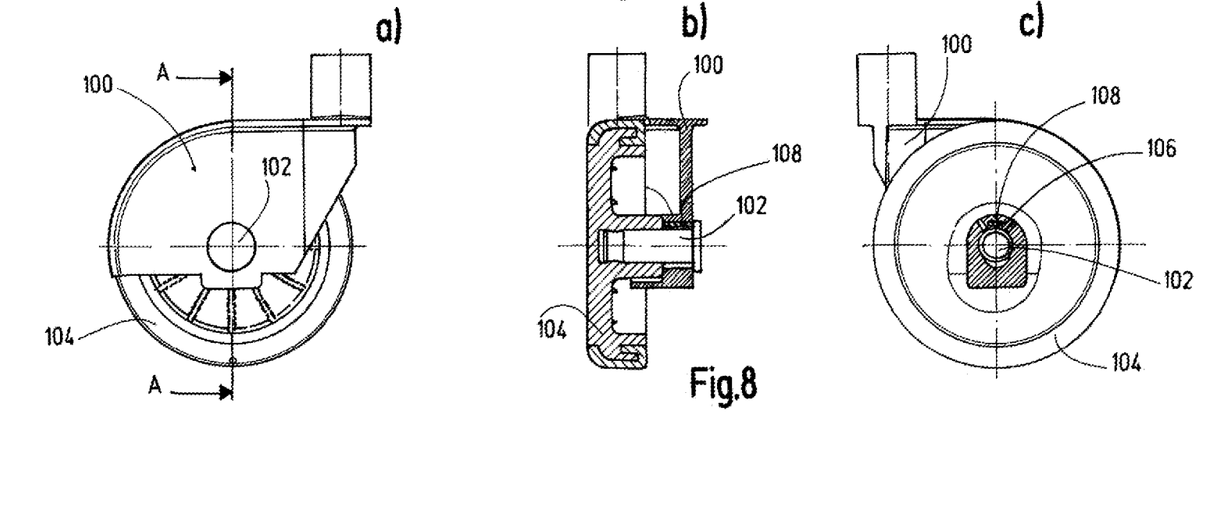
FIGS. 8*a* to *c* show the caster according to FIG. 7 in the loaded, rolling state.

The casters according to FIGS. 7 to 12 each have a housing 100, 100', 100" arranged on one side, with an axle pin 102 arranged therein to mount the wheel 104 in a manner allowing rotation The braking device according to FIG. 7 (braked state) and 8 (rolling state) corresponds to the braking device illustrated in FIGS. 1 and 2, such that reference can be made to the description of the essential features. The housing 100 has two notches above the axle 102, which enable a resilient deflection of a spring portion 106 which is positioned between the notches and which acts on the axle 102 according to the given load state. To reinforce the spring part 106, a spring element 108 consisting of a heavy-duty material, such as a spring steel, is inserted into it.

Figure 9:
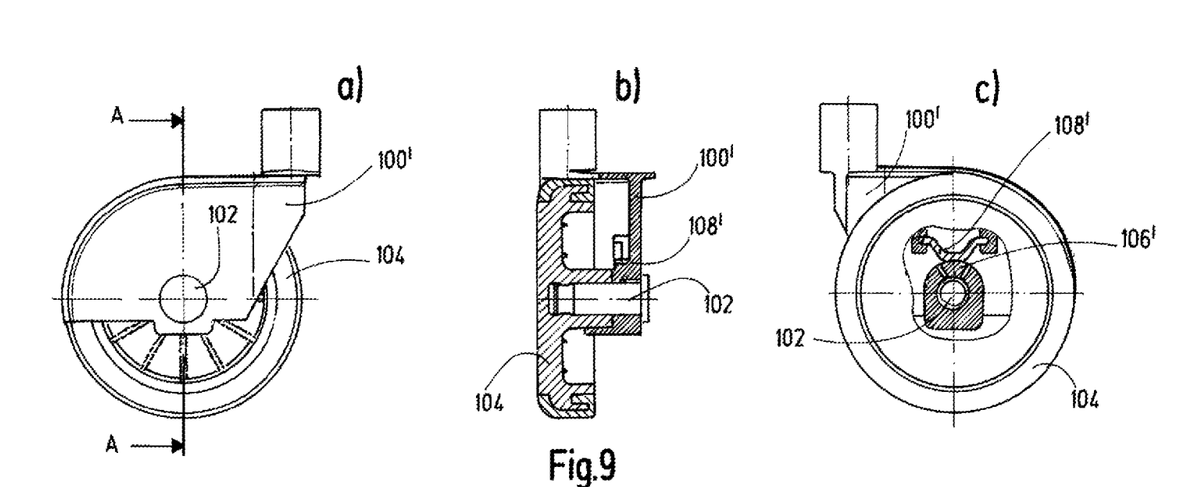
FIGS. 9*a* to *c* show an unloaded, braked caster with a single wheel and a braking device which corresponds to the braking device shown in FIGS. 3 and 4.
Figure 10:
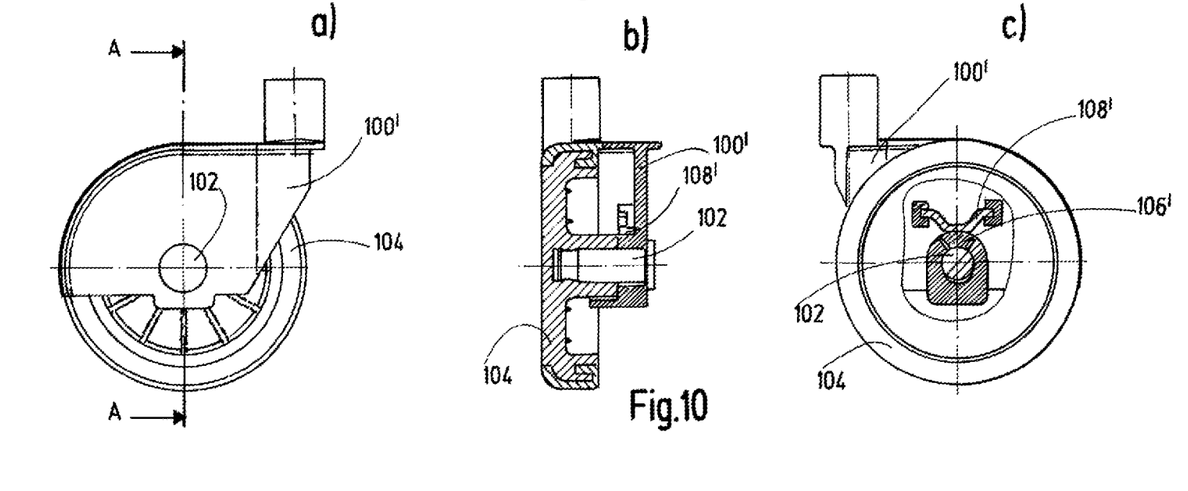
FIGS. 10*a* to *c* show the caster according to FIG. 9 in the loaded, rolling state.

The braking device according to FIG. 9 (braked state) and FIG. 10 (rolling state) corresponds to the braking device illustrated in FIGS. 3 and 4, such that reference can be made to the description of the essential features. The spring part 106' of the housing 100' of this caster has no internal spring element for reinforcement.

Rather, it has a spring element 108' which is arranged above the spring part 106' and consists of a heavy-duty material—for example, a spring steel.

Figure 11:
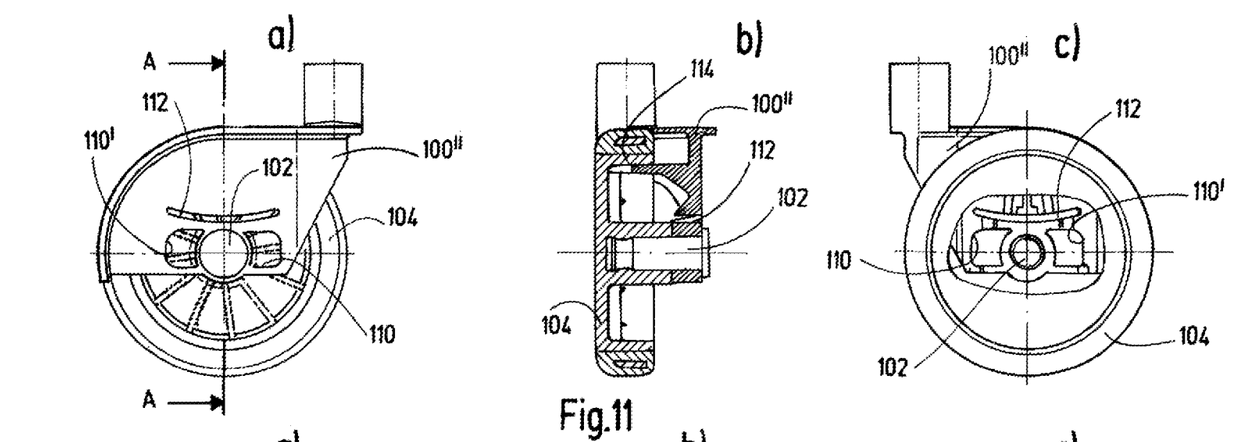
Figure 12:
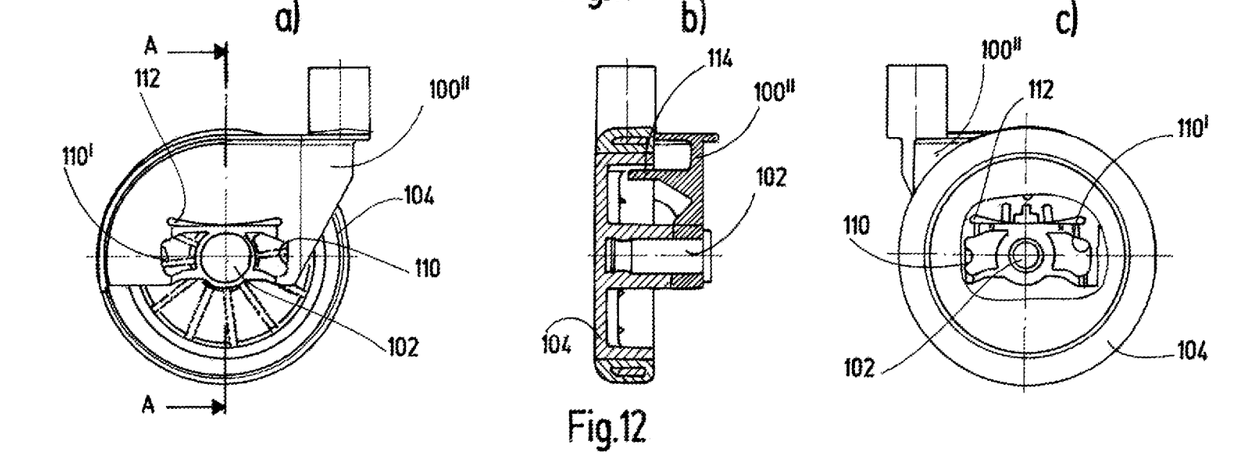
FIGS. 12*a* to *c* show the caster according to FIG. 11 in the loaded, rolling state.

The braking device according to FIG. 11 (braked state) and FIG. 12 (rolling state) corresponds to the braking device illustrated in FIGS. 5 and 6, such that reference can be made to the description of the essential features. The housing 100" of this caster has recesses 110, 110' and 112 which enable an elastic deformation of the portion of the housing 100" which receives the axle 102 when the caster is loaded, such that the inner side of a brake element 114 acts on the outer region of the wheel 104.

In summary, the following is to be noted: the present disclosure relates to a caster, having a housing 10, having an axle pin 16 which is arranged in a housing opening 14, 14' oriented substantially horizontally, and on which at least one wheel 18, 18' is mounted, having, at the top, a pin opening 12 oriented substantially vertically, for receiving a pivot pin, and having a braking device which brakes the at least one wheel 18, 18' in a first load state and releases the wheel in a second load state, wherein the housing opening 14, 14' for the axle pin 16 allows a limited ability of the axle pin 16 to be displaced vertically, and the braking device comprises at least one resilient housing portion 20, 20' which acts on the axle pin 16. In an alternative embodiment, the present disclosure relates to a caster, having a housing 10', having an axle pin 16' which is arranged in a housing opening 14' oriented substantially horizontally, and on which at least one wheel 18, 18' is mounted, having, at the top, a pin opening 12 oriented substantially vertically, for receiving a pivot pin, and having a braking device which brakes the at least one wheel 18, 18' in a first load state and releases the wheel in a second load state, wherein the braking device comprises at least one resilient housing portion. In order to realize a cost-effective, yet mechanically reliable braking device, according to a first variant of the present disclosure, the braking device further comprises at least one spring element 28, 28', 28" which cooperates with the at least one resilient housing portion 20, 20', enhancing the braking force effect and/or increasing the mechanical load capacity of the at least one resilient housing portion 20, 20'. Alternatively, the housing opening 14' oriented substantially horizontally is formed in a housing portion 34 which is elastically vertically displaceable relative to the rest of the housing 14'.

The invention claimed is:

1. A caster, having a housing, having an axle pin which is arranged in a housing opening oriented substantially horizontally, and on which at least one wheel is mounted, having, at the top, a pin opening oriented substantially vertically, for accommodating a pivot pin, and having a braking device which brakes the at least one wheel in a first load state and releases it in a second load state, wherein the housing opening for the axle pin allows a limited ability of the axle pin to be displaced vertically, and the braking device comprises at least one resilient housing portion which acts on the axle pin, wherein the braking device further comprises at least one spring element which works together with the at least one resilient housing portion to enhance the braking force thereof.

2. The caster according to claim 1, wherein the housing, or at least the at least one resilient housing portion, is made of a plastic.

3. The caster according to claim 2, wherein the at least one spring element is designed as a leaf spring which is embedded in the material of the at least one resilient housing portion.

4. The caster according to claim 1, wherein the at least one spring element is made of a material having a higher mechanical load capacity than that of the at least one resilient housing portion.

5. The caster according to claim 4, wherein the at least one spring element is made of metal or a fiber-reinforced plastic.

6. The caster according to claim 1, wherein the housing has at least one wall portion which projects laterally beyond the housing opening for the axle pin, and which a hub of the at least one wheel engages with a force fit and/or a positive fit in the first, braking load state of the caster.

7. The caster according to claim 1, wherein the at least one resilient housing portion is created by at least two open-edged slots in a ring collar of the housing opening which receives the axle pin, said slots holding the at least one resilient housing portion between them.

8. The caster according to claim 1, wherein the caster is designed as a double caster with two wheels, each arranged at one end region of the axle pin, wherein the braking device has two resilient housing portions, each facing one wheel.

9. The caster according to claim 1, wherein the at least one spring element projects beyond the at least one resilient housing portion in the direction of the at least one wheel.

10. The caster according to claim 1, wherein the at least one spring element is arranged on a lateral housing surface, acting on the side of the at least one resilient housing portion which faces away from the axle pin, in such a manner that the at least one resilient housing portion is clamped between the at least one spring element and the axle pin.

11. The caster according to claim 10, wherein projections are arranged on the lateral housing surface, defining end regions of the at least one spring element on the lateral housing surface.

12. The caster according to claim 1, wherein the at least one spring element which works together with the at least one resilient housing portion is adapted to increase the mechanical load capacity of the at least one resilient housing portion.

13. A caster, having a housing, having an axle pin which is arranged in a housing opening oriented substantially horizontally, and on which at least one wheel is mounted, having, at the top, a pin opening oriented substantially vertically, for accommodating a pivot pin, and having a braking device which brakes the at least one wheel in a first load state and releases it in a second load state, wherein the braking device comprises at least one resilient housing portion, wherein the housing opening oriented substantially horizontally is formed in the at least one resilient housing portion which is elastically vertically displaceable relative to the rest of the housing, and wherein the at least one resilient housing portion is integrally connected to the rest of the housing via a plurality of spring webs.

14. The caster according to claim 13, wherein the housing portion is separated from the rest of the housing by a gap which defines the vertical displaceability of the housing portion.

15. The caster according to claim 14, wherein an elastically compressible molded part or a leaf spring is arranged in the gap.

16. The caster according to claim 15, wherein a lateral housing surface has at least one laterally protruding projection which serves as a stop for the housing portion.

17. The caster according to claim 13, wherein the housing has at least one projection which protrudes laterally beyond a lateral housing surface and acts as a brake shoe, arranged radially inward relative to a wheel jacket of the at least one wheel, in such a manner that a braking surface of the projection engages with a force fit or a positive fit with the radially-inner region of the wheel jacket in the first load state.

18. The caster according to claim 13, wherein the housing is made of a plastic.

19. A caster, having a housing, having an axle pin which is arranged in a housing opening oriented substantially horizontally, and on which at least one wheel is mounted, having, at the top, a pin opening oriented substantially vertically, for accommodating a pivot pin, and having a braking device which brakes the at least one wheel in a first load state and releases it in a second load state, wherein the braking device comprises at least one resilient housing portion and the housing opening oriented substantially horizontally is formed in the at least one resilient housing portion which is elastically vertically displaceable relative to the rest of the housing, wherein the at least one resilient housing portion receiving the axle pin is arranged in a honeycomb structure with open honeycomb cells running parallel to the housing opening which receives the axle pin.

20. The caster according to claim 19, wherein the housing portion is separated from the rest of the housing by a gap which defines the vertical displaceability of the housing portion, and wherein an elastically compressible molded part or a leaf spring is arranged in the gap.

* * * * *